US009013954B2

(12) United States Patent
Parshin et al.

(10) Patent No.: US 9,013,954 B2
(45) Date of Patent: Apr. 21, 2015

(54) METHOD FOR DETERMINING PROPERTIES OF A FORMATION

(75) Inventors: Anton Vladimirovich Parshin, Moscow (RU); Evgeny Nikolaevich Dyshlyuk, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 518 days.

(21) Appl. No.: 13/531,363

(22) Filed: Jun. 22, 2012

(65) Prior Publication Data

US 2012/0327743 A1    Dec. 27, 2012

(30) Foreign Application Priority Data

Jun. 23, 2011    (RU) ................................ 2011125732

(51) Int. Cl.
| | | |
|---|---|---|
| G01V 11/00 | (2006.01) | |
| G01V 1/30 | (2006.01) | |
| G01V 1/50 | (2006.01) | |
| G01V 9/00 | (2006.01) | |

(52) U.S. Cl.
CPC ............. *G01V 11/00* (2013.01); *G01V 9/005* (2013.01); *G01V 1/306* (2013.01); *G01V 1/50* (2013.01); *G01V 2210/624* (2013.01); *G01V 2210/6246* (2013.01)

(58) Field of Classification Search
CPC . G01V 1/50; G01V 1/306; G01V 2210/6246; G01V 2210/624; G01V 9/005; G01V 11/00
See application file for complete search history.

(56) References Cited

U.S. PATENT DOCUMENTS

| | | | |
|---|---|---|---|
| 3,164,988 A * | 1/1965 | Cook .......................... | 73/152.13 |
| 3,656,344 A * | 4/1972 | Johns .......................... | 73/152.12 |
| 3,892,128 A | 7/1975 | Smith, Jr. | |
| 4,343,181 A | 8/1982 | Poppendiek | |
| 4,644,283 A | 2/1987 | Vinegar et al. | |
| 4,855,912 A | 8/1989 | Banavar et al. | |
| 6,755,246 B2 | 6/2004 | Chen et al. | |
| 6,854,338 B2 * | 2/2005 | Khuri-Yakub et al. .... | 73/861.27 |

(Continued)

FOREIGN PATENT DOCUMENTS

| | | |
|---|---|---|
| CA | 2461995 C | 11/2010 |
| GB | 2071319 A | 9/1981 |

(Continued)

OTHER PUBLICATIONS

Brie, et al., "Quantitative Formation Permeability Evaluation from Stoneley Waves", SPE Reservoir Evaluation & Engineering, vol. 3 (2), Apr. 2000, pp. 109-117.

(Continued)

*Primary Examiner* — Ari M Diacou

(57) ABSTRACT

A method for determining properties of a formation comprises disposing at least one acoustic logging tool in a well and moving the logging tool along the well. An acoustic logging is performed during movement of the acoustic logging tool together with simultaneous thermal treatment of the formation. A temperature of a formation zone being thermally treated is measured as well as attenuation and velocity of the Stoneley waves excited by the acoustic logging tool. Based on the obtained dependencies of measured parameters as functions of the formation zone temperature formation relative phase permeabilities, formation fluid viscosity and viscous flow activation energy are determined.

6 Claims, 1 Drawing Sheet

(56) References Cited

U.S. PATENT DOCUMENTS

| | | | |
|---|---|---|---|
| 7,027,928 B2* | 4/2006 | DiFoggio | 702/13 |
| 8,122,951 B2 | 2/2012 | Fukuhara et al. | |
| 8,560,265 B2* | 10/2013 | Popov et al. | 702/136 |
| 8,607,628 B2* | 12/2013 | Charara et al. | 73/152.05 |
| 8,613,315 B2* | 12/2013 | Shako et al. | 166/255.2 |
| 2002/0083771 A1* | 7/2002 | Khuri-Yakub et al. | 73/589 |
| 2006/0256656 A1* | 11/2006 | Sinha et al. | 367/31 |
| 2009/0168598 A1 | 7/2009 | Wu et al. | |
| 2011/0154895 A1* | 6/2011 | Charara et al. | 73/152.16 |
| 2013/0289962 A1* | 10/2013 | Wendt et al. | 703/10 |
| 2014/0116683 A1* | 5/2014 | Dyshlyuk et al. | 166/248 |

FOREIGN PATENT DOCUMENTS

| | | |
|---|---|---|
| GB | 2071319 B | 10/1983 |
| RU | 2136880 C1 | 9/1999 |
| RU | 2006106171 A | 9/2007 |
| SU | 1125519 A1 | 11/1984 |

OTHER PUBLICATIONS

Chang, et al., "Effective porosity, producible fluid, and permeability in carbonates from NMR logging", SPWLA 35 Annual Logging Symposium, 1994, 21 pages.

Chang, et al., "Low-frequency tube waves in permeable rocks", Geophysics, vol. 53 (4), 1988, pp. 519-527.

Fleury, et al., "Validity of permeability prediction from NMR measurements", Comptes Rendus de l'Académie des Sciences—Series IIC—Chemistry, vol. 4 (11), Nov. 2001, pp. 869-872.

Liu, et al., "Effects of an Elastic Membrane on Tube Waves in Permeable Formations", The Journal of the Acoustical Society of America, 101(6), 1997, pp. 3322-3329.

Pampuri, et al., "Effective Evaluation of Fluid Mobility From Stoneley Waves Using Full Biot Model Inversion: Two Case Histories", SPE 49132—SPE Annual Technical Conference and Exhibition, New Orleans, Louisiana, Sep. 27-30, 1998, 11 pages.

Rosenbaum, J.H., "Synthetic Microseismograms: Logging in Porous Formations", Geophysics, vol. 39 (1), 1974, pp. 14-32.

Seccombe, et al., "Ranking Oil Viscosity in Heavy Oil Reservoirs", SPE 97935—SPE/PS-CIM/CHOA International Thermal Operations and Heavy Oil Symposium, Calgary, Alberta, Canada, Nov. 1-3, 2005, 12 pages.

Tang, et al., "Borehole Stoneley Wave Propagation across Permeable Structures", Geophysical Prospecting, vol. 41 (2), Feb. 1993, pp. 165-187.

Tang, et al., "Dynamic permeability and borehole Stoneley waves: A simplified Biot-Rosenbaum model", Journal of the Acoustical Society of America, vol. 90 (3), 1991, pp. 1632-1646.

Tang, et al., "Effects of a Logging Tool on the Stoneley Waves in Elastic and Porous Boreholes", The Log Analyst, vol. 34 (5), 1993, pp. 46-56.

Tang, et al., "Fast inversion of formation permeability from Stoneley wave logs using a simplified Biot-Rosenbaum model", Geophysics, vol. 61(3), 1996, pp. 639-645.

Tezuka, et al., "Modeling of Low-frequency Stoneley Wave Propagation in an Irregular Borehole", SEG Annual Meeting, Los Angeles, California, Oct. 23-28, 1994, pp. 24-27.

Winkler, et al., "Permeability and borehole Stoneley waves: Comparison between experiment and theory", Geophysics, vol. 54 (1), 1989, pp. 66-75.

Zittel, et al., "Reservoir Crude Oil Viscosity Estimation From Wireline NMR Measurements—Rajasthan, India", SPE 101689—SPE Reservoir Evaluation & Engineering, vol. 11 (3), Jun. 2008, pp. 545-553.

* cited by examiner

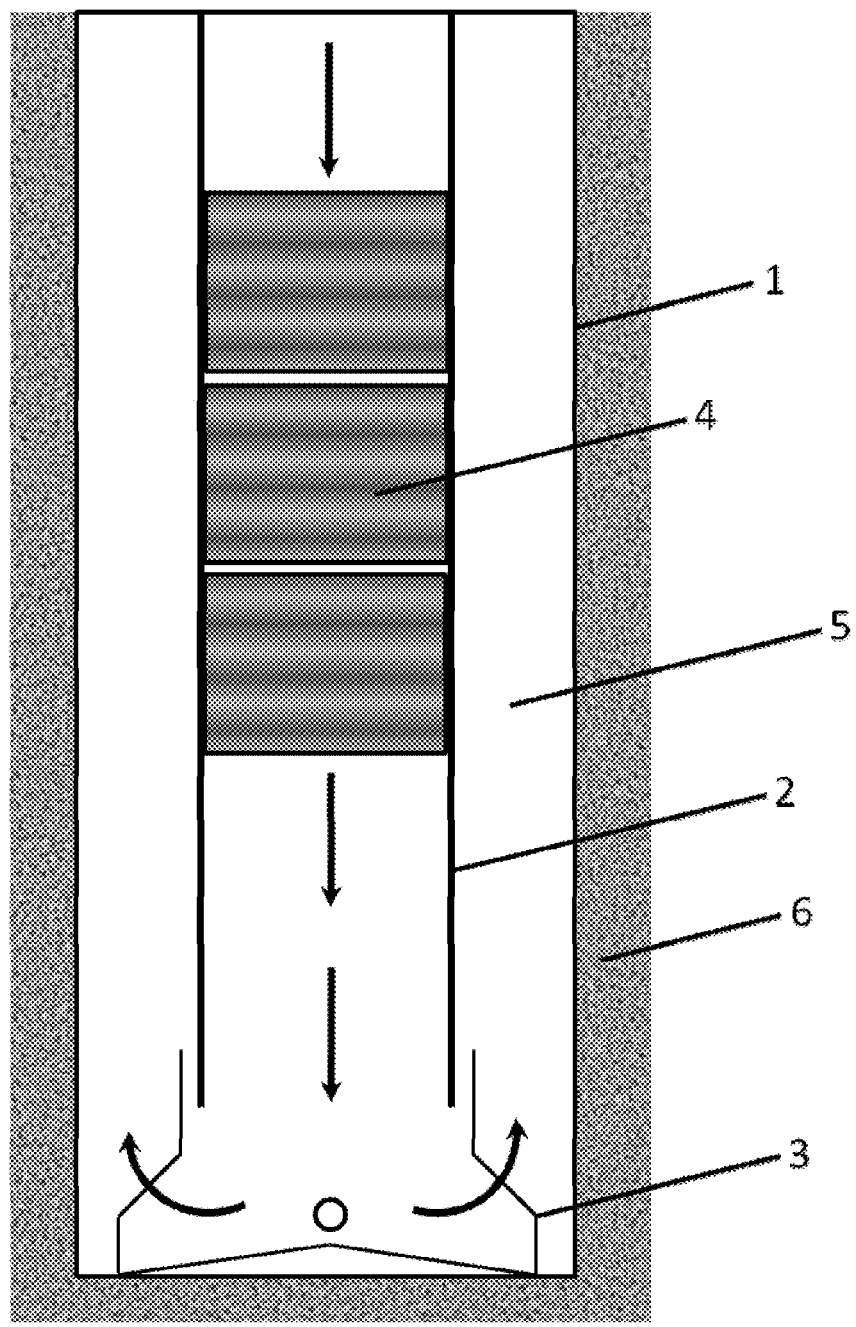

METHOD FOR DETERMINING PROPERTIES OF A FORMATION

CROSS-REFERENCE TO RELATED APPLICATION

This application claims priority to Russian Patent Application Serial No. RU 2011125732 filed Jun. 23, 2011, which is incorporated herein by reference in its entirety.

FIELD OF THE DISCLOSURE

The disclosure is related to methods of productive formation exploration using well logging techniques. In particular, the disclosure is related to methods for determining hydrogeological properties of a formation surrounding a well, such as phase permeability and formation fluid viscosity.

BACKGROUND OF THE DISCLOSURE

Rock permeability and formation fluid viscosity are key petrographical parameters throughout all stages of the oil or gas field development. These parameters are crucial for reservoir evaluation, optimal completion, production optimization and drainage pattern optimization for maximum hydrocarbon recovery. At the same time permeability and viscosity measurements are one of the most difficult measurements to get in a well.

Despite the fact that viscosity is a property of the formation fluid while permeability is formation property, measurements of these parameters and the methods used are closely related with each other. Permeability measurements normally include the measurement of two physical properties—mobility (ratio of permeability to formation fluid viscosity) and fluid viscosity.

Existing direct methods for pore fluid viscosity and formation permeability determination include pore fluid sampling with subsequent analysis, petrophysical and geo-chemical analysis of core plugs, pressure buildup and drawdown tests. All these methods require long-time measurements and high expenses for the implementation thereof. Besides, they provide not continuous information, i.e., contain only data of certain number of points along the borehole.

Acoustic measurements enable measuring a fluid mobility. To determine the pore space permeability additional information of the fluid viscosity is required. Viscosity measurement is a complex problem and normally requires auxiliary measurements.

From the prior art methods for rock properties' determination during the formation thermal treatment are known. Thus, in the USSR Certificate of Invention No. 1125519 a method for determining properties of productive formations is described; in accordance with this method a reservoir undergoes a thermal treatment and nuclear-magnetic or acoustic logging is performed before and after the thermal treatment. Free-fluid index, longitudinal relaxation time and porosity are measured, and oil recovery ratio is evaluated based on the measurement data. The formation thermal regime is in this case set by means of thermal agent injection or by establishing in-situ combustion.

In another patent—U.S. Pat. No. 6,755,246 a method is described in accordance with which a formation is passively or actively heated to increase the formation fluid temperature thus changing a relaxation time T2 of spin echo measurements which is used to identify and quantify heavy oil saturation. This method disadvantage is that it relies on empirical ratios during the measurement results' interpretation, which in a number of cases dramatically reduces the accuracy and applicability thereof. A disadvantage of NMR method is that the decay time constant in some formations, e.g., in low-permeability sandstones, is very small which prevents measuring signals with sufficient accuracy. The main problem relating relaxation times to formation permeability is that the pores studied by NMR need not to be hydraulically connected. Therefore an impermeable medium containing disconnected vugs could yield the same $T_1$ decay curves as a permeable rock containing connected pores.

SUMMARY OF THE DISCLOSURE

The disclosed method provides for formation fluid viscosity determination at different rock temperatures with simultaneous determination of formation permeability without additional measurements, which results in much more informative measurements and logging, expansion of technological options, and functionality of the equipment used.

The method for determining properties of a formation comprises disposing at least one acoustic logging tool in a well, moving the logging tool along the well and conducting an acoustic logging during movement of the acoustic logging tool together with simultaneous thermal treatment of the formation. A temperature of a formation zone being thermally treated is measured as well as attenuation and velocity of the Stoneley waves excited by the acoustic logging tool. Based on the obtained dependencies of measured parameters as functions of the formation zone temperature formation relative phase permeabilities, formation fluid viscosity and viscous flow activation energy are determined.

The thermal treatment of the formation can be performed by means of heating or cooling thereof.

Acoustic logging may be performed during drilling, in this case the logging tool is located on the drilling string and the formation thermal treatment is performed by means of circulating a drilling mud or a flush fluid.

The drilling mud/flush fluid may be additionally heated or cooled on the surface.

If necessary at least one additional well acoustic logging may be performed using, for example, one additional logging tool located upstream in the well.

BRIEF DESCRIPTION OF THE FIGURES

FIG. 1 shows an embodiment of the disclosed method.

DETAILED DESCRIPTION

A drilling string 2 with logging tools 4 located above a drill bit 3 positioned on the drilling string 2 is used to drill a well 1. The well 1 is drilled using known technology. Logging is performed continuously as the drilling string 2 with the logging tools 4 located thereon moves up or down in the well 1. While a formation zone 6 is drilled, the formation zone 6 is also thermally treated by means of flush fluid 5 circulating in the well 1 and temperature of the formation zone 6 is measured.

A Stoneley wave velocity $V_t$ in the well 1 may be determined, e.g., using the following equation:

$$V_t^{-2} = \rho_f \left[ \frac{1}{K_f} + \frac{1}{G} - \frac{2}{ir\omega} \frac{k_0}{\eta_f} \sqrt{-i\omega/D} \frac{K_1(r\sqrt{-i\omega/D})}{K_1(r\sqrt{-i\omega/D})} \right], \quad (1)$$

where ω is a cyclic frequency, $\rho_f$, $\eta_f$, $K_f$—density, viscosity and bulk modulus of elasticity of a pore fluid; G, $k_0$—shear modulus and absolute permeability of the formation, φ—formation porosity, r—well radius, $K_{0,1}(x)$—Kelvin functions; D—diffusion factor for type 2 Biot wave (slow wave):

$$D = \frac{k_0}{\eta_f} \frac{K_f}{\phi} (1+\xi)^{-1},$$

where $$\xi = \frac{K_f}{\phi\left(K_b + \frac{4}{3}G\right)} \left\{1 + \frac{1}{K_s}\left[\frac{4}{3}G\left(1 - \frac{K_b}{K_s}\right) - K_b - \phi\left(K_b + \frac{4}{3}G\right)\right]\right\},$$

where $K_b$, where $K_b$, $K_s$ are bulk moduli of elasticity of the formation and formation material, respectively. If there are two phases of the fluid present in the pore space, then:

$$D = \frac{k_0}{\eta_f} \frac{K_f}{\phi} (1+\xi)^{-1} = (1+\xi)^{-1} \frac{K_f}{\phi} k_0 \left(\frac{k_1}{\eta_1} + \frac{k_2}{\eta_2}\right),$$

where $\eta_{1,2}$, $k_{1,2}$ are viscosities and relative phase permeabilities for the liquid phases filling the pore space. For hard formations: $K_b+(4/3)G \gg K_f$, and ξ correction may be neglected:

$$D \approx \frac{k_0}{\eta_f} \frac{K_f}{\phi} = \frac{K_f}{\phi} k_0 \left(\frac{k_1}{\eta_1} + \frac{k_2}{\eta_2}\right).$$

The Stoneley wave velocity calculated using equation (1) is a complex value. To obtain phase velocity $c_t$ and attenuation coefficient α it is necessary to segregate real and imaginary parts of this equation:

$$c_t^{-1} = Re(V_t^{-1}), \alpha = \omega Im(V_t^{-1}).$$

The main temperature-dependent values in equation (1) are parameters of pore fluids filling porous medium $K_f$, $\rho_f$, $\eta_f$ ($\eta_{1,2}$), and variations of solid phase parameters with the temperature in most cases may be neglected. The impact of the variation of the parameters above is well differentiated. The variation of the bulk modulus of elasticity and fluid density as function of temperature influences, mostly, the variation of the phase velocity, whereas viscosity variation influences mostly attenuation variation.

Variations of attenuation frequency dependencies and Stoneley wave velocities is the foundation of a known method for a pore fluid mobility determination ($\mu = k_0/\eta_f$) (cf., for example, Chang, S. K., Liu, H. L. and Johnson, D. L., "Low-Frequency Tube Waves in Permeable rocks," Geophysics, 1988, Vol. 53, pp. 519-527), commercially applied by a number of oil and service companies (see, for example, U.S. Publication 2009/0168598). Pore fluid mobility determination at different temperatures enables studying the pore fluid viscosity variation as a function of temperature because the permeability variation at different temperatures may be neglected. Liquid phases' viscosity as a function of temperature may be approximated with a good accuracy using Arrhenius law:

$$\eta = \eta^0 \exp(W/RT),$$

where $\eta^0$ is constant, W—viscous flow activation energy, T—absolute temperature, R—universal gas constant.

Measuring frequency characteristics of attenuation α(ω) and a Stoneley wave phase velocity $c_t(\omega)$ for different temperatures and using numerical solution methods for model (1) it is possible to determine temperature dependence η(T). In case of two-phase liquid in a porous medium near a wellbore wall (drilling mud filtrate and oil) liquids' activation energies may differ and contributions of the liquids into η(T) coefficient will change as the temperature changes. In this case apriori information of η(T) dependence for one of the liquids (drilling mud filtrate) enables determination of η(T) dependence for another liquid.

Determination of fluid viscosity during interpretation of mobility measurements using Stoneley wave at different temperatures advantageously eliminates a need to perform additional fluid viscosity measurements by other methods to determine the formation permeability.

In accordance with the disclosed method velocity and attenuation of the Stoneley waves generated by the logging tools 4 are measured relative to the respective temperature variation created by the flush fluid 5 circulation. Then the parameters measured at different temperatures of the formation zone 6 are analyzed. As a result relative phase permeabilities, formation fluid viscosity and viscous flow activation energy may be determined using the determined velocity and attenuation of the acoustic waves generated by the logging tools 4 as function of temperature and using the fluid viscosity as function of temperature.

What is claimed is:

1. A method for determining properties of a formation comprising:
   disposing at least one acoustic logging tool in a well within the formation,
   moving the logging tool along the well,
   conducting an acoustic logging during movement of the acoustic logging tool and simultaneously performing a thermal treatment of the formation,
   measuring a temperature of a formation zone being thermally treated,
   measuring attenuation and velocity of the Stoneley waves excited by the acoustic logging tool,
   obtaining dependencies of measured parameters as functions of the formation zone temperature, and
   determining formation relative phase permeabilities, formation fluid viscosity and viscous flow activation energy based on the obtained dependencies.

2. The method of claim 1 wherein the thermal treatment of the formation is performed by heating or cooling thereof.

3. The method of claim 1 wherein the acoustic logging is performed during drilling, the logging tool is located on a drilling string and the thermal treatment of the formation is performed by circulating a drilling mud or a flush fluid.

4. The method of claim 3 further comprising additional heating or cooling of the drilling mud performed on a surface.

5. The method of claim 1 wherein at least one additional acoustic logging of the well is performed.

6. The method of claim 5 wherein the additional acoustic logging is performed by at least one additional logging tool located upstream in the well.

* * * * *